United States Patent
Fu

(10) Patent No.: US 12,317,132 B2
(45) Date of Patent: May 27, 2025

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Zhe Fu, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 339 days.

(21) Appl. No.: 17/726,026

(22) Filed: Apr. 21, 2022

(65) Prior Publication Data

US 2022/0248267 A1  Aug. 4, 2022

Related U.S. Application Data

(63) Continuation of application No. PCT/CN2019/122123, filed on Nov. 29, 2019.

(51) Int. Cl.
*H04W 28/082* (2023.01)
*H04W 28/02* (2009.01)

(52) U.S. Cl.
CPC ..... *H04W 28/082* (2023.05); *H04W 28/0263* (2013.01)

(58) Field of Classification Search
None
See application file for complete search history.

(56) References Cited

U.S. PATENT DOCUMENTS

| 10,813,005 | B2* | 10/2020 | Loehr | H04W 72/52 |
| 2015/0131578 | A1 | 5/2015 | Baek et al. | |
| 2015/0271726 | A1 | 9/2015 | Kim et al. | |
| 2018/0279262 | A1 | 9/2018 | Babaei et al. | |
| 2018/0288631 | A1 | 10/2018 | Wei et al. | |
| 2018/0310202 | A1 | 10/2018 | Löhr et al. | |
| 2018/0368107 | A1 | 12/2018 | Babaei | |
| 2018/0368132 | A1 | 12/2018 | Babaei | |
| 2019/0215685 | A1* | 7/2019 | Wang | H04W 4/40 |
| 2019/0239279 | A1* | 8/2019 | Shi | H04W 76/15 |
| 2019/0253926 | A1* | 8/2019 | Kim | H04L 1/08 |

(Continued)

FOREIGN PATENT DOCUMENTS

| CN | 109548085 A | 3/2019 |
| CN | 109644489 A | 4/2019 |

(Continued)

OTHER PUBLICATIONS

International Search Report issued in corresponding International Application No. PCT/CN2019/122123, mailed Aug. 26, 2020, 29 pages.

(Continued)

*Primary Examiner* — Otis L Thompson, Jr.
(74) *Attorney, Agent, or Firm* — BAYES PLLC

(57) ABSTRACT

A wireless communication method, a terminal device, and a network device. The method comprises: in the case of deactivating duplicated transmission of a first bearer and satisfying a split transmission condition, the terminal device performs split transmission by using a first radio link control (RLC) entity and a second RLC entity in at least two RLC entities configured by the first bearer.

14 Claims, 4 Drawing Sheets

200

In the case that a data duplication transmission of a first bearer is deactivated and a split transmission condition is met, the terminal device performs the split transmission by using a first radio link control (RLC) entity and a second RLC entity in at least two RLC entities configured for the first bearer  — S210

(56) References Cited

U.S. PATENT DOCUMENTS

| | | | | |
|---|---|---|---|---|
| 2020/0107215 | A1* | 4/2020 | Lee | H04L 45/24 |
| 2020/0120522 | A1* | 4/2020 | Xiao | H04W 36/00692 |
| 2020/0178327 | A1* | 6/2020 | Jiang | H04W 76/19 |
| 2020/0374752 | A1* | 11/2020 | Xiao | H04W 76/15 |
| 2021/0029777 | A1* | 1/2021 | Lv | H04W 80/02 |
| 2021/0144583 | A1* | 5/2021 | Xiao | H04W 28/04 |
| 2021/0250139 | A1* | 8/2021 | Zhang | H04L 5/0091 |

FOREIGN PATENT DOCUMENTS

| | | |
|---|---|---|
| CN | 109644490 A | 4/2019 |
| CN | 109673023 A | 4/2019 |
| CN | 109937587 A | 6/2019 |
| CN | 110311751 A | 10/2019 |
| CN | 110505160 A | 11/2019 |
| EP | 3737154 A1 | 11/2020 |
| EP | 3902370 A1 | 10/2021 |
| WO | 2019036861 A1 | 2/2019 |
| WO | 2019134529 A1 | 7/2019 |

OTHER PUBLICATIONS

Written Opinion of the International Searching Authority issued in corresponding International Application No. PCT/CN2019/122123, mailed Aug. 26, 2020, 7 pages.

"Discussion on data duplication enhancement in IIoT", Agenda Item: 6.7.4.1, Source: OPPO, 3GPP TSG-RAN WG2 #107bis, R2-1912733, Chongqing, China, Oct. 14-18, 2019, 5 pages.

"Scenarios for dynamic activation", Agenda Item: 11.7.4, Source: Ericsson, 3GPP TSG-RAN WG2 #106, Tdoc R2-1906853, Reno, US, May 13-17, 2019, 6 pages.

"New WID: Support of NR Industrial Internet of Things (IoT)", Agenda Item: 9.1.2., Source: Nokia, Nokia Shanghai Bell, 3GPP TSG RAN Meeting #83 RP-190728, Shenzhen, China, Mar. 18-21, 2019, 6 pages.

"3rd Generation Partnership Project; Technical Specification Group Radio Access Network; NR; Radio Link Control (RLC) protocol specification (Release 15) The", 3GPP TS 38.322 V15.5.0 (Mar. 2019), 33 pages.

"3rd Generation Partnership Project; Technical Specification Group Radio Access Network; NR; Packet Data Convergence Protocol (PDCP) specification (Release 16)", 3GPP TS 38.323 V16.4.0 (Jun. 2021). 40 pages.

"3rd Generation Partnership Project; Technical Specification Group Radio Access Network; NR; Radio Resource Control (RRC) protocol specification (Release 16)", 3GPP TS 38.331 V16.5.0 (Jun. 2021), 956 pages.

First Office Action issued in corresponding Chinese application No. 202210468109.2, mailed May 23, 2023.

First Office Action issued in corresponding European application No. 19954666.4, mailed Jun. 5, 2023.

Liu Xiaoman et al., "Discussion on LTE-NR Dual Connection Technique", Publisher: Mobile Communication, Release Date: Oct. 15, 2017.

ZTE, "Further Considerations on Split Option 3", R3-162847, 3GPP TSG RAN WG3 Meeting#94 Reno, Nevada, USA, Nov. 14-18, 2016.

Azad Ravanshid et al., "Multi-Connectivity Functional Architectures in 5G", IEEE ICC2016—Workshops: W01-Third Workshop on 5G Architecture (5GArch 2016), May 2016.

Subramanya Chandrashekar et al., "5G Multi-RAT Multi-Connectivity Architecture", IEEE ICC2016—Workshops: W01-Third Workshop on 5G Architecture (5GArch 2016), May 2016.

Extended European Search Report issued in corresponding European application No. 19954666.4, mailed Sep. 6, 2022.

Second Office Action issued in corresponding Chinese application No. 202210468109.2, mailed Aug. 10, 2023.

Notice of Allowance issued in corresponding Chinese application No. 202210468109.2, mailed Oct. 27, 2023.

* cited by examiner

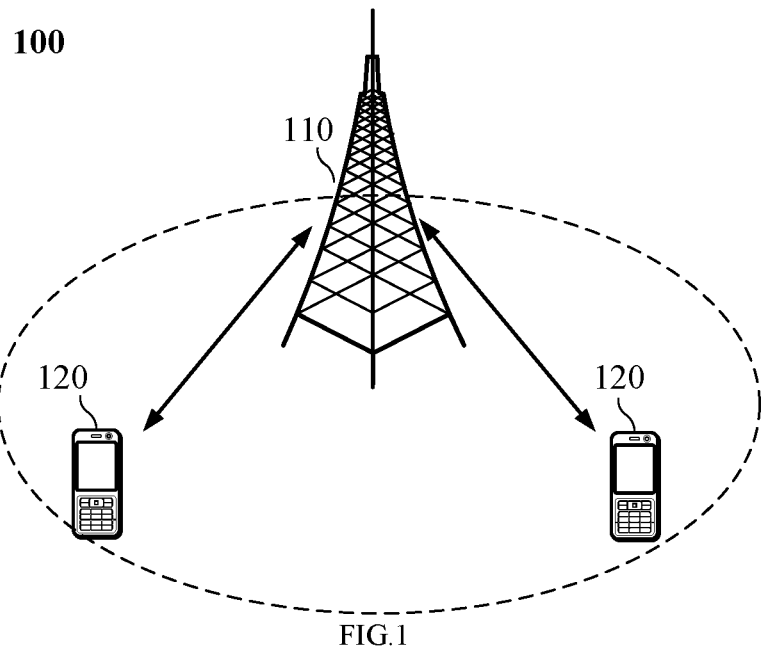
FIG.1
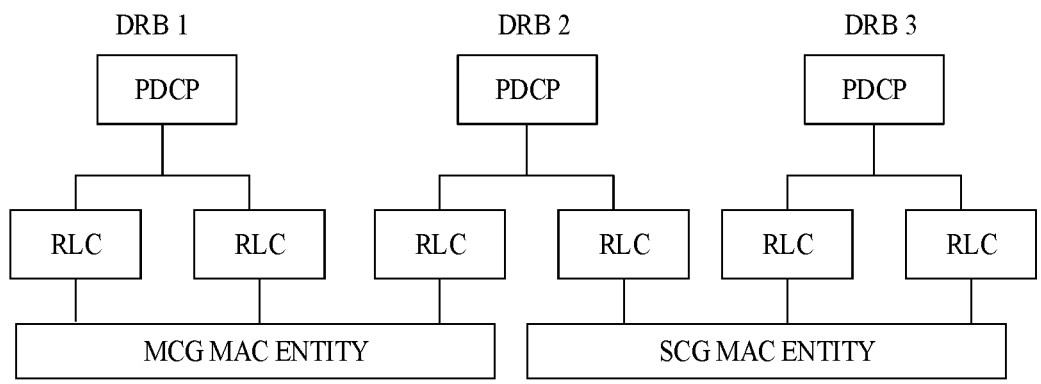
FIG.2
200
| In the case that a data duplication transmission of a first bearer is deactivated and a split transmission condition is met, the terminal device performs the split transmission by using a first radio link control (RLC) entity and a second RLC entity in at least two RLC entities configured for the first bearer | — S210 |
FIG.3

400
First information is transmitted to the terminal device from the network device, and the first information is used for indicating RLC entities that are used when the data duplication transmission of a bearer is deactivated and the split transmission condition is met. ⟵S410
FIG.6
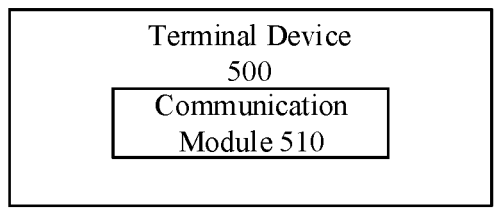
FIG.7
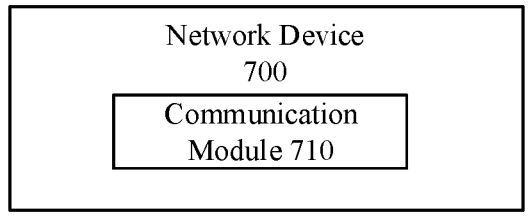
FIG. 8
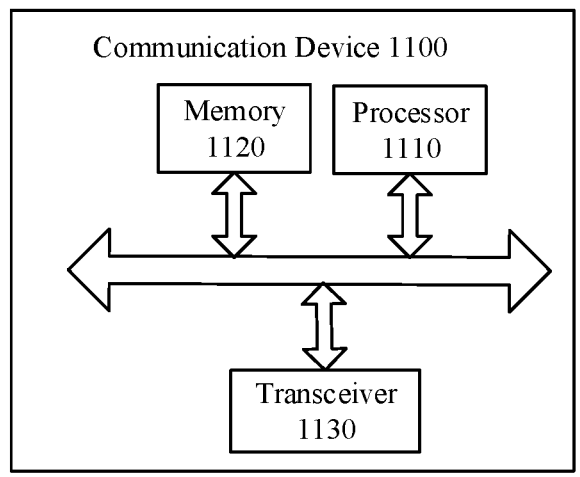
FIG.9

WIRELESS COMMUNICATION METHOD, TERMINAL DEVICE, AND NETWORK DEVICE

CROSS-REFERENCE TO RELATED APPLICATION

This application is a continuation of International Application No. PCT/CN2019/122123, entitled "WIRELESS COMMUNICATION METHOD, TERMINAL DEVICE, AND NETWORK DEVICE" filed on Nov. 29, 2019, the disclosure of which is incorporated herein by reference in its entirety.

TECHNICAL FIELD

Embodiments of the present application relate to the field of communications, and in particular, to a wireless communication method, a terminal device, and a network device.

BACKGROUND

In the New Radio (NR) system, a terminal device can adopt the data duplication method to improve the reliability of data transmission. Specifically, in Release 15 (Rel-15), a bearer can be configured with two Radio Link Control (RLC) entities, and the Packet Data Convergence Protocol (PDCP) layer corresponding to the bearer can duplicate PDCP protocol data unit (PDU) into two identical copies, that is, the PDCP PDU and a duplicated PDCP PDU. The two copies of PDCP PDU pass through different RLC layers and media access control (MAC) layer, and are transmitted to a network device through the air interface finally.

In addition, when the data duplication is deactivated and a split transmission condition is met, the terminal device can transmit split data through the two RLC entities corresponding to the bearer, that is, transmit different data through different RLC entities. The split transmission condition is that RLC data volume and PDCP data volume to be transmitted of the two RLC entities are greater than or equal to a preset threshold.

SUMMARY

Embodiments of the present application provide a wireless communication method, a terminal device, and a network device, which can determine the condition for split transmission and the RLC entity used for split transmission when a bearer is configured with at least two RLC entities.

A first aspect provides a wireless communication method, including: in response to determining that a data duplication transmission of a first bearer is deactivated and a split transmission condition is met, performing, by a terminal device, a split transmission by using a first radio link control (RLC) entity and a second RLC entity in at least two RLC entities configured for the first bearer.

A second aspect provides a wireless communication method, including: transmitting, by a network device, first information to a terminal device, and the first information is used for indicating RLC entities that are used when a data duplication transmission of a bearer is deactivated and a split transmission condition is met.

A third aspect provides a terminal device for executing the method according to the first aspect and various implementation manners thereof. Specifically, the terminal device includes units for executing the method according to the first aspect and various implementation manners thereof.

A fourth aspect provides a network device for executing the method according to the second aspect or any possible implementation manner of the second aspect. Specifically, the network device includes units for executing the method according to the second aspect or any possible implementation manner of the second aspect.

A fifth aspect provides a terminal device including a processor and a memory. The memory is configured to store a computer program, and the processor is configured to call and run the computer program stored in the memory to execute the method described in the first aspect or various implementation manners thereof.

A sixth aspect provides a network device including a processor and a memory. The memory is configured to store a computer program, and the processor is configured to call and run the computer program stored in the memory to execute the method described in the second aspect or various implementation manners thereof.

A seventh aspect provides a chip for implementing methods of any one of the first to second aspects or various implementations thereof.

Specifically, the chip includes: a processor for calling and running a computer program from a memory, enabling a device installed with the chip to execute methods of any one of the first to second aspects or various implementations thereof.

An eighth aspect provides a computer-readable storage medium for storing a computer program that enables a computer to execute methods of any one of the first to second aspects or various implementations thereof.

A ninth aspect provides a computer program product. The computer program product includes computer program instructions that enable a computer to execute methods of any one of the first to second aspects or various implementations thereof.

A 10th aspect provides a computer program. The computer program, when executed on a computer, causes the computer to execute methods of any one of the first to second aspects or various implementations thereof.

BRIEF DESCRIPTION OF THE DRAWINGS

FIG. 1 is a schematic diagram illustrating an application scenario provided by embodiments of the present application.

FIG. 2 is a schematic architecture diagram of a data duplication transmission method.

FIG. 3 is a schematic diagram illustrating a wireless communication method provided by embodiments of the present application.

FIG. 6 is a schematic diagram illustrating another wireless communication method provided by embodiments of the present application.

FIG. 7 is a schematic block diagram illustrating a terminal device according to embodiments of the present application.

FIG. 8 is a schematic block diagram illustrating a network device according to embodiments of the present application.

FIG. 9 is a schematic block diagram illustrating a communication device according to another embodiment of the present application.

DETAILED DESCRIPTION

Figure 4:
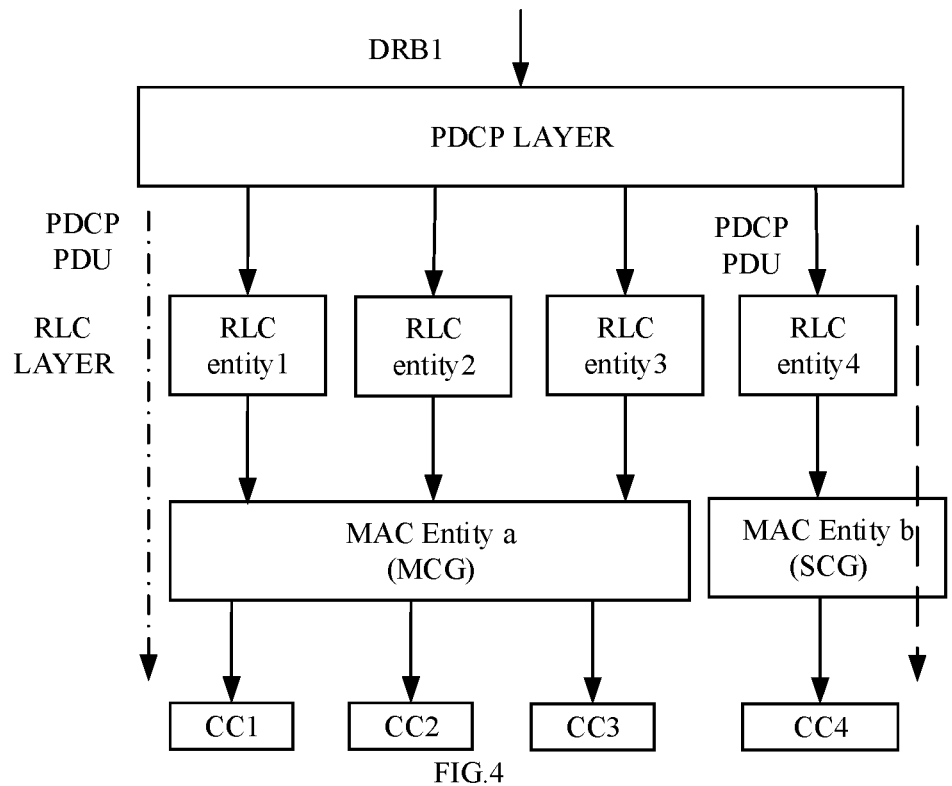
FIG. 4 is a schematic diagram illustrating an example of a split transmission manner according to embodiments of the present application.

The technical solutions of the embodiments of the present application will be described below with reference to the accompanying drawings of the embodiments of the present application. Apparently, only a part of the embodiments, not all the embodiments of the present application, are described.

All other embodiments obtained, based on the embodiments described in the present application, by those skilled in the art without paying creative efforts shall fall within the protection scope of the present application.

The technical solutions of the embodiments of the present application can be applied to various communication systems, for example, a Global System of Mobile communication (GSM) system, a Code Division Multiple Access (CDMA) system, a wideband code division multiple access (WCDMA) system, General Packet Radio Service (GPRS), a Long Term Evolution (LTE) system, a LTE Frequency Division Duplex (FDD) system, a LTE Time Division Duplex (TDD) systems, an Advanced long term evolution (LTE-A) system, a New Radio (NR) system, an evolution system of the NR system, a LTE-based access to unlicensed spectrum (LTE-U) system, a NR-based access to unlicensed spectrum (NR-U) system, a Universal Mobile Telecommunication System (UMTS), a global Worldwide Interoperability for Microwave Access (WiMAX) communication system, Wireless Local Area Networks (WLAN), Wireless Fidelity (WiFi), a next-generation communication system or other communication systems, etc.

Generally speaking, traditional communication systems support a limited number of connections and are easy to implement. However, with the development of communication technologies, mobile communication systems will support not only traditional communications, but also communications such as Device to Device (D2D) communication, Machine to Machine (M2M) communication, Machine Type Communication (MTC), and Vehicle to Vehicle (V2V) communication, etc. Embodiments of the present disclosure can also be applied to such communication systems.

For example, a communication system 100 to which embodiments of the present application are applied is shown in FIG. 1. The communication system 100 can include a network device 110 communicating with a terminal device 120 (or referred to as a communication terminal or a terminal). The network device 110 can provide communication coverage over a specific geographic area, and can communicate with terminal devices located in the coverage area. Optionally, the network device 110 may be a base transceiver station (BTS) in a GSM system or a CDMA system, or a Node B (NB) in a WCDMA system, or an evolutional Node B (eNB or eNode B) in an LTE system, or a radio controller in a cloud radio access network (CRAN). Optionally, the network device may be a mobile switching center, a relay station, an access point, an in-vehicle device, a wearable device, a hub, a switch, a network bridge, a router, a network side device in the 5G network, or a network device in the future evolution of the public land mobile network (PLMN), etc.

The communication system 100 further includes at least one terminal device 120 located in the coverage area of the network device 110. The "terminal device" as used herein includes, but are not limited to, devices connected via a wired line, such as a connection via Public Switched Telephone Networks (PSTN), a Digital Subscriber Line (DSL), a digital cable and a direct cable; and/or another data connection/network; and/or via a wireless interface, such as cellular network, Wireless Local Area Network (WLAN), digital television network such as DVB-H network, satellite network and an AM-FM broadcast transmitter; and/or a device of another terminal configured to receive/send communication signals; and/or an Internet of things (IOT) device.

A terminal device configured to communicate via a wireless interface can be referred to as "a wireless communication terminal", "a wireless terminal" or "a mobile terminal". Examples of mobile terminals include, but are not limited to, satellite or cellular phones; Personal Communications System (PCS) terminals integrated with capabilities of cellular radio phones, data processing, fax, and data communication; a PDA that can include radio phones, pagers, Internet/intranet accessing, Web browser, memo pad, calendar, and/or Global Positioning System (GPS) receiver; and conventional laptop and/or palmtop receivers or other electronic device including radio telephone transceivers. The terminal device can refer to access terminals, user equipment (UE), user units, user stations, mobile stations, mobile platforms, remote stations, remote terminals, mobile equipment, user terminals, terminals, wireless communication equipment, user agents, or user devices. The access terminal may be a cellular phone, a cordless phone, a Session Initiation Protocol (SIP) phone, a wireless local loop (WLL) station, a personal digital assistant (PDA), computing devices, handheld devices having wireless communication functions, or other processing devices connected to wireless modems, in-vehicle devices, wearable devices, terminal devices in 5G networks, or terminal devices in the future evolution of PLMN, etc.

Optionally, a Device to Device (D2D) communication may be performed between the terminal devices 120.

Optionally, the 5G system or 5G network may also be referred to as a New Radio (NR) system or NR network.

FIG. 1 exemplarily illustrates one network device and two terminal devices. Optionally, the communication system 100 may include multiple network devices, and the number of terminal devices within the coverage of each network device is not limited to be two, which is not limited in the embodiments of the present application.

Optionally, the communication system 100 may further include other network entities such as a network controller and a mobility management entity, which is not limited in the embodiments of the present disclosure.

It should be understood that a device with communication functions in the network/system in the embodiments of the present disclosure may be referred to as a communication device. Taking the communication system 100 shown in FIG. 1 as an example, communication devices may include the network device 110 and the terminal device 120 having communication functions, and the network device 110 and the terminal device 120 may be specific devices described above, which will not be repeated here. The communication devices may also include other devices in the communication system 100, such as the network controller, the mobile management entity and other network entities, which are not limited in the embodiments of the present disclosure.

It should be understood that the terms "system" and "network" herein are generally interchangeable herein. The term "and/or" herein is only used to describe an association relationship between associated objects, which represents that there may be three kinds of relationships.

For example, A and/or B may represent three situations: A exists alone, A and B exist at the same time, and B exists alone.

In addition, the character "/" herein generally represents an "or" relationship between pre and post associated objects.

The data duplication transmission method in the dual connection (DC) or carrier aggregation (CA) scenario provided by some embodiments of the present application is briefly introduced below with reference to FIG. 2.

In a dual connection (DC) scenario, multiple network nodes (Cell Group (CG)) can provide service for the terminal device, and the data duplication transmission can be performed between the cell group and the terminal device. It should be understood that, in embodiments of the present application, the CG may be equivalent to a network node or a network device or the like.

Specifically, in the DC scenario, the protocol architecture of the data duplication transmission mode may be shown as in DRB 2 in FIG. 2. The Packet Data Convergence Protocol (PDCP) is located in a certain CG (for example, a master CG (MCG) or a secondary CG (SCG), also called as a master node (MN) or secondary node (SN)). A PDCP protocol data unit (PDU) is duplicated into two identical copies by the PDCP, for example, one copy is a PDCP PDU, and the other is a duplicated PDCP PDU. The two PDCP PDUs pass through the Radio Link Control (RLC) layer and Media Access Control (MAC) layer of different CGs, then reach a corresponding MAC layer and RLC layer of a terminal device (downlink) or a base station (uplink) through the air interface, and finally converge to the PDCP layer. If the PDCP layer monitors that the two PDCPs are the same duplicated copies, then one copy can be discarded and the other can be submitted to a higher layer.

In embodiments of the present application, by transmitting two PDCP PDUs through different CGs, a purpose of frequency diversity gain can be achieved, thereby improving the reliability of data transmission.

It should be understood that, for a bearer configured with data duplication transmission (for example, a data radio bearer (DRB) or a signaling radio bearer (SRB)), the data duplication transmission function of a certain bearer can be dynamically activated or deactivated through a MAC control element (CE).

Further, in the embodiments of the present application, an entity as the lower layer of the PDCP that is used for transmitting the duplicated data may also be called as a leg or path, or may be replaced with a logical channel (LCH), that is, the RLC entity may be replaced with a leg or a path. Correspondingly, a RLC entity identity may be replaced with a LCH identity or a leg identity.

The protocol architecture of the data duplication transmission mode in the CA scenario may be shown as in DRB 1 or DRB 3 in FIG. 2. The data duplication transmission method adopts the protocol architecture of CA. Specifically, in the case that the data duplication transmission is activated, the data generated by the PDCP layer (the PDU and the duplication data of the PDU) is respectively transmitted to two different RLC entities, and the two different RLC entities are mapped to different physical layer carriers through the same MAC layer entity.

It can be understood that, in the embodiments of the present application, the data generated by the PDCP layer (the PDU and the duplication data of the PDU) is respectively mapped to different physical layer carriers through two different RLC entities. Therefore, the purpose of frequency diversity gain can be achieved, and the reliability of data transmission can be further improved.

In the case that the data duplication transmission is deactivated and the split transmission condition is met, the terminal device may also use the two RLC entities corresponding to the bearer to transmit split data, that is, to transmit different data through the two RLC entities. The split transmission condition may be that the data volume of PDCP to be transmitted of the two RCL entities and the RLC data volume are greater than or equal to a preset threshold.

A data duplication transmission mode that supports only two RLC entities is described above. In R16, the data duplication transmission mode supports at least two RLC entities. Specifically, when the data duplication transmission is activated, the CA architecture, the DC architecture, or the combination of the DC and CA architecture can be used to perform the data duplication transmission. Similarly, the data generated by the PDCP layer (PDU and duplicated PDU) is respectively mapped to the lower layer through at least two different RLC entities for transmission, so as to achieve the purpose of frequency diversity gain, thereby improving the reliability of data transmission.

However, when the data duplication transmission is deactivated, how to redefine the split transmission condition and how to determine the RLC entity for the split transmission are urgent problems to be solved.

FIG. 3 is a schematic flowchart illustrating a wireless communication method 200 provided by embodiments of the present application. The method 200 may be executed by a terminal device in the communication system shown in FIG. 1. As shown in FIG. 3, the method 200 may include at least some of the following contents:

In S210, in the case that a data duplication transmission of a first bearer is deactivated and a split transmission condition is met, the terminal device performs the split transmission by using a first radio link control (RLC) entity and a second RLC entity in at least two RLC entities configured for the first bearer.

Specifically, for the data duplication transmission in the DC scenario or the data duplication transmission in a scenario where DC and CA are combined, a radio bearer may correspond to at least two RLC entities. When the data duplication transmission of the first bearer is deactivated, the terminal device can determine a target RLC entity in the at least two RLC entities configured for the first bearer, and can further perform the split transmission by using the target RLC entity.

In the embodiments of the present application, the terminal device may receive configuration information of the first bearer from a network device. Optionally, the configuration information may include at least one of:

an identity of the first bearer;
identities of at least two RLC entities;
an identity of at least one cell group configured for the first bearer, wherein each cell group in the at least one cell group configuration is configured with at least one RLC entity;
a primary RLC entity or a primary leg; and
a first threshold, for example, an uplink split data threshold (ul-DataSplitThreshold) and/or a Release 16 (Rel-16) uplink split data threshold (ul-DataSplitThreshold-r16).

In the embodiments of the present application, the target RLC entity may include two RLC entities, denoted as a first RLC entity and a second RLC entity. Alternatively, the target RLC entity may include more RLC entities. The target RLC entity may be used for transmitting split data, that is, the terminal device can transmit different data in the split data through the two RLC entities or more RLC entities.

Moreover, the target RLC entity may also include one RLC entity. Accordingly, only one RLC entity performs data transmission, that is, the split transmission is not supported in this case. In this case, the target RLC entity may be a primary RLC entity, a primary cell (Pcell), a primary secondary cell (Pscell), a specifically identified RLC entity, a RLC entity in a specific CG, any RLC entity, or one of the first RLC entity and the second RLC entity. Optionally, the target RLC entity used in this scenario may be determined through a network instruction, pre-definition, and may be determined by the terminal device itself.

It should be noted that, whether the terminal device can enable the split transmission is configurable. For example, the terminal device may determine, according to an instruction or configuration of the network device, whether to perform the split transmission when the data duplication transmission of the first bearer is deactivated.

For example, if it is instructed by the network device to enable the split transmission, the terminal device may perform the split transmission when the data duplication transmission of the first bearer is deactivated and the split transmission condition is met; or if it is instructed by the network device to close the split transmission, the terminal device does not perform the split transmission even if the data duplication transmission of the first bearer is deactivated and the split transmission condition is met.

Hereinafter, description is made by taken the situation where the target RLC entity includes the first RLC entity and the second RLC entity as an example, but the embodiments of the present application are not limited to this.

In this embodiment of the present application, the first bearer is configured with at least two RLC entities, for example, four RLC entities, and the at least two RLC entities may belong to at least one cell group of the first bearer, that is, each cell group in the at least one cell group corresponding to the first bearer is configured with at least one RLC entity.

For example, the MCG and the SCG are respectively configured with two RLC entities, or the MCG is configured with one RLC entity and the SCG is configured with two or three RLC entities.

Optionally, the first bearer may be DRB or SRB.

The first bearer is configured with the data duplication transmission function, and the network device can dynamically activate or deactivate the data duplication transmission of the first bearer.

For example, the network device may activate or deactivate the data duplication transmission of the first bearer through the MAC CE.

In the case that the data duplication transmission of the first bearer is activated, the terminal device may select, among at least two RLC entities configured for the first bearer, two or more RLC entities for data duplication transmission.

In the case that the data duplication transmission of the first bearer is deactivated, the terminal device may determine whether to perform the split transmission according to whether initial transmission data amount corresponding to the first bearer meets the split transmission condition.

For example, if the initial transmission data amount corresponding to the first bearer meets the split transmission condition, it is determined to perform the split transmission; otherwise, it is determined to perform a normal data transmission. Alternatively, the terminal device may also determine whether to perform the split transmission according to an instruction of the network device.

For example, if the network device instructs the terminal device to perform the split transmission, the terminal device determines to perform the split transmission, otherwise, determines to perform the normal data transmission. It should be understood that the normal data transmission referred to herein is neither split transmission nor data duplication transmission, specifically, a data packet of the first bearer is transmitted through a RLC entity.

Optionally, in some embodiments of the present application, the terminal device may determine the target RLC entity used for split transmission according to first information. The first information may be used for indicating RLC entities that are used when the split transmission condition is met. That is, the terminal device may determine the RLC entities used for the split transmission according to the instruction of the network device, and may further perform the split transmission by using the RLC entities instructed by the network device.

In some embodiments, the first information is used to indicate at least two available (or activated) RLC entities, for example, the first information may include at least one of: a RLC entity identity, a logical channel (LCH) identity (ID), a cell group ID, and a quantity of RLC entities.

Then, when split transmission is required, the terminal device may determine two RLC entities for the split transmission among at least two available RLC entities indicated by the first information. Alternatively, when the data duplication transmission is required, the terminal device may also determine RLC entities for the data duplication transmission among the at least two available RLC entities indicated by the first information.

Optionally, in some embodiments, the at least two available RLC entities may include at least one of: a primary RLC entity or a primary leg of the first bearer, a primary RLC entity of the MCG of the bearer, a primary RLC entity of the SCG of the first bearer.

It should be understood that, in some embodiments, the primary RLC entity of the first bearer may also be the primary RLC entity of the MCG of the first bearer, or the primary RLC entity of the SCG of the first bearer, or may also be other RLC entities among the RLC entities configured for the first bearer.

Optionally, in some embodiments, the first information may be configured by the network device, or may be determined by the terminal device itself, or may be pre-defined.

As an embodiment, the first information may be carried in a first signaling. The first signaling may be any downlink signaling, for example, MAC CE signaling, downlink control information (DCI) signaling or radio resource control (RRC) signaling, etc.

The network device may activate or deactivate the data duplication transmission of the first bearer through duplicated MAC CE.

In some embodiments, the MAC CE used to carry the first information is not the duplicated MAC CE, that is, the MAC CE is not used to perform related operations such as activating or deactivating the data duplication transmission of the first bearer. Correspondingly, a new logical channel (LCH) identify (ID) needs to be introduced into the MAC CE used to carry the first information, and the LCH ID is used to identify the MAC CE with such specific function.

In some embodiments, the first signaling may further include second information, and the second information is used to indicate RLC entities that are used for data transmission when the split transmission condition is not met.

Then, when the data duplication transmission of the first bearer is deactivated and the split transmission condition is not met, the terminal device can determine, according to the RLC entity indicated by the second information, RLC entities for normal data transmission, and can further perform normal data transmission by using the RLC entities.

Optionally, in some embodiments, the second information includes at least one of:
  a RLC entity identity, a logical channel (LCH) identity (ID), a cell group identity (ID).

As another embodiment, the first information may be carried in a first duplication MAC CE, and the first duplication MAC CE is used to indicate alteration of the RLC entity and/or activation or deactivation of the data duplication transmission of the first bearer.

Optionally, the alteration of the RLC entity may refer to the alteration of the RLC entities configured for the first bearer, for example, the RLC entities configured for the first bearer are altered to RLC entity 1, RLC entity 2 and RLC entity 4 from RLC entity 1, RLC entity 2 and RLC entity 3. For another example, the RLC entities configured for the first bearer are altered to RLC entity 1 and RLC entity 2 from RLC entity 1, RLC entity 2 and RLC entity 3.

Optionally, in some embodiments, the first duplication MAC CE may further include indication information, and the indication information is used for indicating a data transmission mode of the terminal device. The data transmission mode may include at least two of: a data transmission mode where the data duplication transmission of the first bearer is activated, a data transmission mode where the data duplication transmission of the first bearer is deactivated, the splitting transmission. Alternatively, the indication information can also indicate more data transmission modes, for example, non-splitting transmission, the embodiment of this application is not limited to this.

Optionally, in some embodiments, the first duplication MAC CE may be a duplication MAC CE that supports Release 16, that is, Rel-16 duplication MAC CE. In the Release 16, it is supported that one bearer is configured with at least two RLC entities.

In some embodiments, only the first duplication MAC CE is used for indicating the alteration of the RLC entity and the activation or deactivation of the data duplication transmission of the first bearer, which is referred to as mode 1.

Alternatively, in other embodiments, it is also possible to indicate the alteration of the RLC entity and the activation or deactivation of the data duplication transmission of the first bearer through multiple duplication MAC CEs, for example, the first duplication MAC CE and the second duplication MAC CE, the function allocation between the first duplication MAC CE and the second duplication MAC CE is not limited.

As an example rather than a limitation, the function allocation between the first duplication MAC CE and the second duplication MAC CE may be the following typical implementation modes:
  the first duplication MAC CE is used for indicating the alteration of the RLC entity, and the second duplication MAC CE is used for indicating the activation or deactivation of the data duplication transmission of the first bearer, denoted as mode 2;
  the first data duplication transmission is used for indicating the alteration of the RLC entity, the activation of the data duplication transmission and split transmission of the first bearer, and the second duplication MAC CE is used for indicating the deactivation of the data duplication transmission of the first bearer, denoted as mode 3;
  the first duplication MAC CE is used for indicating the alteration of the RLC entity and the activation or deactivation of the data duplication transmission of the first bearer, and the second duplication MAC CE is used for indicating the activation or deactivation of the data duplication transmission of the first bearer, denoted as mode 4;
  the first duplication MAC CE is used for indicating the alteration of the RLC entity and the split transmission of the first bearer, and the second duplication MAC CE is used for indicating the activation or deactivation of the data duplication transmission of the first bearer, denoted as mode 5; the first duplication MAC CE is used for indicating the alteration of the RLC entity, the second duplication MAC CE is used for indicating the activation or deactivation of the data duplication transmission of the first bearer, and the split transmission of the first bearer, denoted as mode 6.

Optionally, in some embodiments, the first duplication MAC CE may be a duplication MAC CE that supports Release 15, that is, Rel-15 duplication MAC CE. In the Release 15, one bearer is configured with two RLC entities.

Hereinafter, the data transmission mode of the terminal device and a method of determining the RLC entity used in the data transmission mode are respectively described in combination with the above six modes.

As for Mode 1

In the mode 1, the first duplication MAC CE may include indication information for indicating the data transmission mode. In other words, the network device may configure the data transmission mode of the terminal device through the first duplication MAC CE, and the terminal device may determine the current data transmission mode of thereof and the RLC entity used in the data transmission mode according to the indication information and the first information.

In some embodiments, the indication information may indicate three data transmission modes: a data transmission mode where the data duplication transmission of the first bearer is activated, a data transmission mode where the data duplication transmission of the first bearer is deactivated, and the split transmission of the first bearer. As Example 1, the indication information may be 2 bits, for example, 00 may be used to indicate activating the data duplication transmission of the first bearer, 01 may be used to indicate deactivating the data duplication transmission of the first bearer, and 10 may be used to indicate the split transmission.

In some other embodiments, the indication information may indicate two data transmission modes of activating duplication transmission of the first bearer and split transmission of the first bearer. As Example 2, the indication information may be 1 bit, for example, 1 may be used to indicate activating the data duplication transmission of the first bearer, and 0 may be used to indicate the split transmission.

With reference to the Example 1, the method of determining the RLC entity used in each data transmission mode is described. For example, the indication information is 00, the first information indicates that the identities of the available RLC entities are 1 and 2, then the terminal device can perform the duplication transmission by using RLC entity 1 and RLC entity 2.

For another example, the indication information is 10, the first information indicates that the identities of the available RLC entities are 1 and 2, then the terminal device can perform the split transmission by using RLC entity 1 and RLC entity 2.

For another example, the indication information is 01, and the available RLC entity indicated by the first information is one RLC entity, then the terminal device can perform normal data transmission by using RLC entity 1 and/or RLC entity 2, or, if the first duplication MAC CE includes second information, and the terminal device may also determine the RLC entity used for normal data transmission according to the second information.

In some other embodiments, the indication information may indicate two data transmission modes of activating the data duplication transmission of the first bearer and deactivating the data duplication transmission of the first bearer. As Example 3, the indication information may be 2 bits, for example, 00 may be used to indicate activation of duplication, and 01 may be used to indicate deactivation of duplication. As Example 4, the indication information may be 1 bit, for example, 1 may be used to indicate activating the data duplication transmission of the first bearer, and 0 may be used to indicate deactivating the data duplication transmission of the first bearer.

With reference to the Example 4, the method of determining the RLC entity used in each data transmission mode is described.

For example, the indication information is 1, the first information indicates that the identities of the available RLC entities are 1 and 2, then the terminal device can perform the duplication transmission by using RLC entity 1 and RLC entity 2. For another example, the indication information is 0, and the first information indicates that the identities of the available RLC entities are 1 and 2, then the terminal device can perform the split transmission by using RLC entity 1 and RLC entity 2 when the split transmission condition is met; or when the split transmission condition is not met, the terminal device can perform data transmission by using RLC entity 1 and/or and RLC entity 2, or perform data transmission by using the main RLC entity; or if the first duplication MAC CE includes the second information, the terminal device can perform data transmission according to the RLC entity indicated by the second information.

As for Mode 2

If the terminal device receives the second duplication MAC CE used to indicate deactivation of the data duplication transmission of the first bearer, and subsequently receives the first duplication MAC CE, where the first duplication MAC CE includes the first information used to indicate at least two available RLC entities (e.g., RLC entity 1 and RLC entity 2), then when the data duplication transmission of the first bearer is deactivated and the split transmission condition is met, the terminal device may determine a RLC entity for the split transmission among the at least two available RLC entities, for example, RLC entity 1 and RLC entity 2 are determined as the RLC entity for the split transmission. Alternatively, when the split transmission condition is not met, one or more RLC entities in at least two available RLC entities are used to transmit the PDCP PDU of the first bearer, or the primary RLC entity is used to transmit the PDCP PDU of the first bearer, or the terminal device may also determine the RLC entity for data transmission according to the second information if the first duplication MAC CE includes the second information.

As for Mode 3

In the mode 3, the first duplication MAC CE may include indication information for indicating the data transmission mode, and the data transmission mode may be split transmission and activation of data duplication transmission of the first bearer. Similarly, the second duplication MAC CE may also include indication information for indicating deactivation of data duplication transmission of the first bearer.

For the convenience of distinction and description, the indication information in the first duplication MAC CE is denoted as first indication information, and the indication information in the second duplication MAC CE is denoted as second indication information.

As some implementation manners, the first indication information may be 2 bits, for example, 00 may be used to indicate activation of data duplication transmission of the first bearer, and 01 may be used to indicate split transmission; or, the first indication information may be 1 bit, for example, 1 may be used to indicate activation of data duplication transmission of the first bearer, and 0 may be used to indicate split transmission. Then, the terminal device determines the current data transmission mode according to the value of the indication information in the first duplication MAC CE, and can further determine the available (or, activated) RLC entity according to the first information in the first duplication MAC CE.

As an implementation manner, the second indication information may be 1 bit, for example, 0 may be used to indicate deactivation of the data duplication transmission of the first bearer, and 1 may be used to indicate that the data transmission mode of the terminal device is not switched.

As an example, the terminal device receives the second duplication MAC CE used for indicating deactivation of the data duplication transmission of the first bearer, and the terminal device also receives the first duplication MAC CE used for indicating at least two available RLC entities (e.g., RLC entity 1 and RLC entity 2). Then, when the split transmission condition is met, the terminal device may determine a RLC entity for the split transmission among the at least two available RLC entities, for example, RLC entity 1 and RLC entity 2 are determined as the RLC entity for the split transmission. Alternatively, when the split transmission condition is not met, one or more RLC entities among at least two available RLC entities are used to transmit the PDCP PDU of the first bearer, or the primary RLC entity is used to transmit the PDCP PDU of the first bearer.

As another example, the terminal device receives the first duplication MAC CE, the indication information in the first duplication MAC CE indicates activation of data duplication transmission of the first bearer, and the first information in the first duplication MAC CE indicates at least two available RLC entities (e.g., RLC entity 1 and RLC entity 2). Then, the terminal device may determine a RLC entity for data duplication transmission among the at least two available RLC entities, for example, RLC entity 1 and RLC entity 2 are determined as RLC entities for data duplication transmission.

As for Mode 4

Both the first duplication MAC CE and the second duplication MAC CE may be used to indicate the activation and deactivation states of data duplication transmission of the first bearer, and at the same time, the second duplication MAC CE may also be used to indicate at least one RLC entity for data transmission in a specific data transmission mode.

Specifically, after receiving the first duplication MAC CE, the terminal device can alter the activation state of data duplication transmission of the first bearer or replace the RLC entity according to the indication of the first duplication MAC CE. After receiving the second duplication MAC CE, the terminal device may alter the activation state of data duplication transmission of the first bearer according to the indication of the second duplication MAC CE.

For example, if the second duplication MAC CE received by the terminal device indicates the deactivation of the data duplication transmission of the first bearer, then the terminal device deactivates the data duplication transmission of the first bearer. Optionally, if the second duplication MAC CE is used to indicate activation of the data duplication transmission of the first bearer, then the terminal device may perform the data duplication transmission through activated RLC entities of an initial configuration, where the initial configuration is used to configure the RLC entities used when the data duplication transmission of the first bearer is activated, and the initial configuration can be configured by RRC signaling or MAC CE. Optionally, the terminal device may also perform data duplication transmission by using the RLC entity used for the last activated data duplication transmission on the first bearer.

For example, if the last data duplication transmission is transmitted through RLC entity 1 and RLC entity 2, then the terminal device can perform data duplication transmission through the two RLC entities.

For another example, if the first duplication MAC CE received by the terminal device is used for indicating deactivation of the data duplication transmission of the first bearer, then the terminal device deactivates the data duplication transmission of the first bearer.

Optionally, if the first duplication MAC CE is used for indicating activation of the data duplication transmission of the first bearer, then the terminal device performs data duplication transmission through the RLC entity indicated by the first information in the first duplication MAC CE.

For example, if the RLC entities indicated by the first information are RLC entity 1 and RLC entity 2, the terminal device may perform data duplication transmission by using the RLC entity 1 and RLC entity 2.

In the mode 4, when the first duplication MAC CE or the second duplication MAC CE indicates deactivation of the data duplication transmission of the first bearer, the terminal device may further determine the RLC entity for the split transmission and the RLC entity for non-split transmission according to the first information in the first duplication MAC CE.

For example, if the RLC entities indicated by the first information are RLC entity 1 and RLC entity 2, the terminal device can perform the split transmission through RLC entity 1 and RLC entity 2 when the split transmission condition is met, or the terminal device may perform data transmission through RLC entity 1 and/or RLC entity 2 when the split transmission condition is not met. Optionally, if one of the RLC entity 1 and the RLC entity 2 is a primary RLC entity, the terminal device can perform data transmission through the primary RLC entity, or if neither the RLC entity 1 nor the RLC entity is a primary RLC entity, the terminal device may also choose to use the primary RLC entity for data transmission. Optionally, if the first duplication MAC CE includes the second information, the terminal device may also determine the RLC entity for non-split transmission according to the second information.

As for Mode 5

For the method of indicating the data transmission mode, details are not repeated here, and reference may be made to the relevant descriptions of the foregoing modes, which are not repeated here for brevity.

As an example, the first duplication MAC CE may include the first information for indicating at least two available RLC entities, such as RLC entity 1 and RLC entity 2. The terminal device may receive the second duplication MAC CE. If the second duplication MAC CE indicates deactivation of the data duplication transmission of the first bearer, then the terminal device may determine RLC entities for the split transmission among the at least two available RLC entities indicated by the first information when the split transmission condition is met, for example, the RLC entity 1 and the RLC entity 2 may be determined as the RLC entities for performing split transmission. Alternatively, when the second duplication MAC CE indicates activation of the data duplication transmission of the first bearer, the terminal device performs data duplication transmission through the RLC entity 1 and the RLC entity 2.

As another example, the terminal device receives the first duplication MAC CE, the first duplication MAC CE is used for indicating split transmission of the first bearer, and further includes the first information for indicating at least two available RLC entities, such as RLC entity 1 and RLC entity 2, the terminal device may determine the RLC entity for the split transmission among the at least two available RLC entities indicated by the first information.

For example, RLC entity 1 and RLC entity 2 may be determined as RLC entities for the split transmission.

As for Mode 6

The first duplication MAC CE is used for indicating the alteration of the RLC entity, the second duplication MAC CE is used for indicating the activation or deactivation of the data duplication transmission of the first bearer, and the split transmission of the first bearer.

For the method of indicating the data transmission mode, details are not repeated here, and reference may be made to the relevant descriptions of the foregoing modes, which are not repeated here for brevity.

As an example, the terminal device may receive the first duplication MAC CE, where the first duplication MAC CE includes the first information, and the first information is used for indicating at least two available RLC entities, such as RLC entity 1 and RLC entity 2. The terminal device may also receive the second duplication MAC CE, and the following describes the method of determining the RLC entities in the three data transmission modes indicated by the second duplication MAC CE.

Case 1: The second duplication MAC CE is used for indicating activation of the data duplication transmission of the first bearer. Then, the terminal device may determine the RLC entities for data duplication transmission among the at least two available RLC entities, for example, RLC entity 1 and RLC entity 2 are determined as the RLC entities for data duplication transmission, and the terminal device may further transmit duplication data through RLC entity 1 and RLC entity 2.

Case 2: The second duplication MAC CE is used for indicating deactivation of the data duplication transmission of the first bearer. When the split transmission condition is met, the terminal device may determine RLC entities for the split transmission among the at least two available RLC entities, for example, RLC entity 1 and RLC entity 2 are determined as RLC entities for the split transmission, and the terminal device may further transmit split data through RLC entity 1 and RLC entity 2. Alternatively, when the split transmission condition is not met, the terminal device determines a RLC entity for normal data transmission among the at least two available RLC entities, for example, RLC entity 1 and/or RLC entity 2 is determined as the RLC entity for normal data transmission.

Case 3: The second duplication MAC CE is used for indicating split transmission of the first bearer. Then, the terminal device may determine the RLC entities for the split transmission among the at least two available RLC entities, for example, RLC entity 1 and RLC entity 2 are determined as the RLC entities for the split transmission, and the terminal device may further transmit split data through RLC entity 1 and RLC entity 2.

Figure 5:
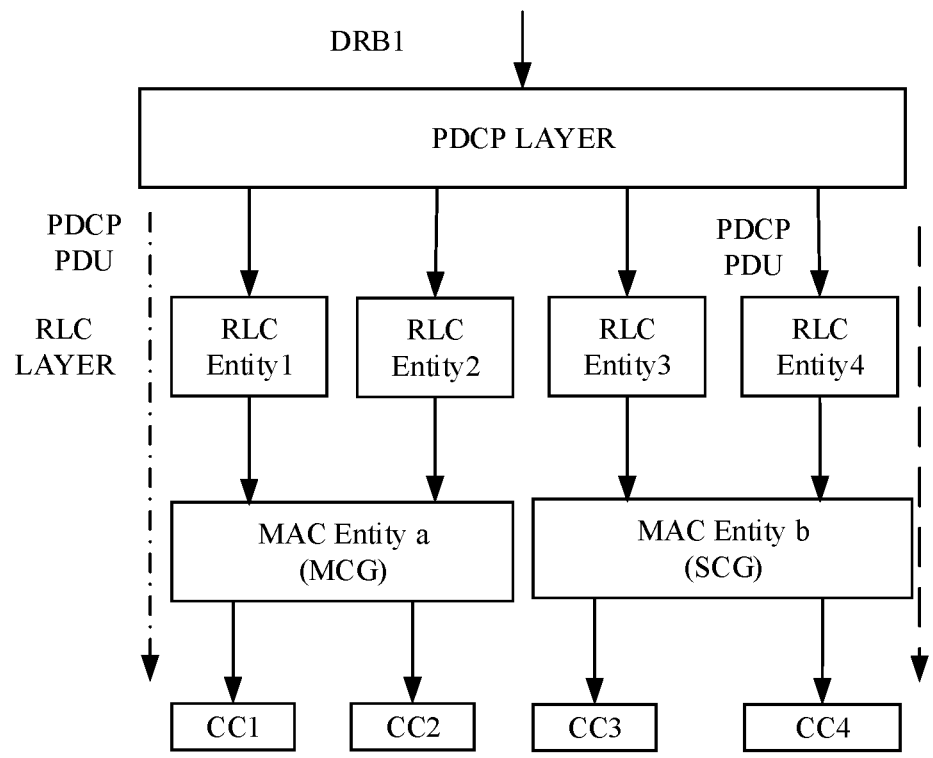
FIG. 5 is a schematic diagram illustrating another example of a split transmission manner according to embodiments of the present application.

A specific description is given with reference to examples shown in FIG. 4 and FIG. 5. As shown in FIG. 4 and FIG. 5, the first bearer is DRB1 configured with 4 RLC entities, that is, RLC entity 1, RLC entity 2, and RLC entity 3 and RLC entity 4. In the example shown in FIG. 4, RLC entity 1, RLC entity 2 and RLC entity 3 correspond to MAC entity 'a', RLC entity 4 corresponds to MAC entity 'b', where the MAC entity 'a' corresponds to the MCG, and the MCG has three component carriers (CC), namely CC1, CC2 and CC3, the MAC entity 'b' corresponds to SCG, and has one CC4. In the example shown in FIG. 5, RLC entity 1 and RLC entity 2 correspond to MAC entity 'a', the MAC entity 'a' corresponds to MCG, and the MCG has two CCs, namely CC1 and CC2; RLC entity 3 and RLC entity 4 correspond to MAC entity 'b' and correspond to SCG, and the SCG has two CCs, namely CC3 and CC4.

For the example shown in FIG. 4, assuming the first information indicates RLC entity 1, RLC entity 2 and RLC entity 4, as an example, the terminal device may select RLC entity 1 among RLC entity 1 and RLC entity 2 corresponding to the MCG, and RLC entity 4 among the RLC entities corresponding to the SCG, as the RLC entities for the split transmission. Further, RLC entity 1 and RLC entity 4 can map the split data to different CCs through the corresponding MAC entities, and the split data is further transmitted to the network device.

For the example shown in FIG. 5, assuming the first information indicates RLC entity 1, RLC entity 2, RLC entity 3 and RLC entity 4, as an example, the terminal device may select RLC entity 1 among RLC entity 1 and RLC entity 2 corresponding to the MCG, and RLC entity 4 among RLC entity 3 and RLC entity 4 corresponding to the SCG, as the RLC entities for the split transmission. Further, RLC entity 1 and RLC entity 4 can map the split data to different CCs through the corresponding MAC entities, and the split data is further transmitted to the network device.

Therefore, in the embodiments of the present application, when the first bearer is configured with at least two RLC entities, the terminal device can determine the RLC entity for the split transmission according to the first information, thereby solving the problem of how to transmit the split data when the RLC entities corresponding to one bearer are more than two. Meanwhile, it can also ensure that the terminal device and the network device have the same understanding, so as to ensure the normal reception of data.

It should be understood that, in the embodiments of the present application, the RLC entity for the split transmission may be selected by the terminal device based on the first information, or may also be selected by the terminal device autonomously, for example, the terminal device may preferentially select, among the primary leg of the first bearer, the primary RLC entity of the MCG of the first bearer, and the primary RLC entity of the SCG of the first bearer, two RLC entities as the RLC entities for the split transmission.

Optionally, in the embodiments of the present application, the target RLC entities used by the terminal device for split transmission may include a combination of any two of the following RLC entities:
  the primary RLC entity (primary leg) of the first bearer;
  the primary RLC entity of the master cell group (MCG) of the first bearer;
  the primary RLC entity of the secondary cell group (SCG) of the first bearer;
  the secondary RLC entity of the master cell group (MCG) of the first bearer; and
  the secondary RLC entity of the secondary cell group (SCG) of the first bearer.

Preferably, in some embodiments, the target RLC entities may be one of the following combinations:
  the primary RLC entity of the first bearer and the primary RLC entity of the master cell group (MCG) of the first bearer, which are different RLC entities;
  the primary RLC entity of the first bearer and the primary RLC entity of the secondary cell group (SCG) of the first bearer, which are different RLC entities; and
  the primary RLC entity of the MCG of the first bearer and the primary RLC entity of the SCG of the first bearer.

Therefore, in the embodiments of the present application, when a bearer is configured with at least two RLC entities, the terminal device preferentially selects a RLC entity for the split transmission among the primary leg of the first bearer, the primary RLC entity of the MCG of the first bearer and the primary RLC entity of the SCG of the first bearer, which can ensure reliable transmission of data.

In some other embodiments of the present application, in the case that the data duplication transmission of the first bearer is deactivated and the split transmission condition is not met, the terminal device may select a third RLC entity for data transmission. The third RLC entity may be determined according to the first information, for example, one or more RLC entities are determined among the RLC entities indicated by the first information, or the third RLC entity may also be determined according to the second information, or may be selected by the terminal device autonomously, for example, the terminal device may preferentially select, among the primary leg of the first bearer, the primary RLC entity of the MCG of the first bearer, and the primary RLC entity of the SCG of the first bearer, one or more RLC entities for data transmission.

Optionally, in some embodiments, the third RLC entity includes at least one of:
  the primary RLC entity of the first bearer;
  the primary RLC entity of the master cell group (MCG) of the first bearer;
  the primary RLC entity of the secondary cell group (SCG) of the first bearer;
  any RLC entity of the first bearer; and
  the RLC entity identified by a specific LCH of the first bearer.

In some embodiments of the present application, the split transmission condition may be that the initial transmission data volume corresponding to the first bearer is greater than or equal to a first threshold.

As some examples, the initial transmission data volume corresponding to the first bearer is one of:
  1. a total amount of the PDCP data volume and the RLC data volume to be initially transmitted in all the RLC entities configured for the first bearer, that is, a total amount of the PDCP data volume and the RLC data volume to be transmitted in the at least two RLC entities configured for the first bearer;
  2. a total amount of the PDCP data volume and the RLC data volume to be initially transmitted in the RLC entities that are configured for the first bearer and are being activated, for example, if the first bearer is configured with RLC entity 1, RLC entity 2 and RLC entity 4, and the currently activated RLC entities are RLC entity 1 and RLC entity 2, then the initial transmission data volume corresponding to the first bearer is the total amount of the PDCP data volume and RLC data volume to be initially transmitted by RLC entity 1 and RLC entity 2;
3. a total amount of the PDCP data volume and the RLC data volume to be initially transmitted in the RLC entities that are configured for the first bearer and have been activated, for example, if the first bearer is configured with RLC entity 1, RLC entity 2, RLC entity 3 and RLC entity 4, the RLC entities activated for the first data duplication transmission are RLC entity 1 and RLC entity 2, and the RLC entities activated for the second data duplication transmission are RLC entity 1 and RLC entity 3, then the RLC entities that are configured for the first bearer and have been activated include RLC entity 1, RLC entity 2 and RLC entity 3, the initial transmission data volume corresponding to the first bearer is the total amount of the PDCP data volume and the RLC data volume to be initially transmitted in RLC entity 1, RLC entity 2 and RLC entity 3;
4. a total amount of the PDCP data volume and the RLC data volume to be initially transmitted in RLC entities that are configured for the first bearer, have been activated and have data to be transmitted, for example, assuming that the first bearer is configured with RLC entity 1, RLC entity 2, RLC entity 3 and RLC entity 4, RLC entities that are configured for the first bearer and have been activated include RLC entity 1, RLC entity 2 and RLC entity 3, among the RLC entity 1, RLC entity 2 and RLC entity 3, the RLC entities that have data to be transmitted include RLC entity 1 and RLC entity 3, then the initial transmission data volume corresponding to the first bearer is the total amount of the PDCP data volume and the RLC data volume to be initially transmitted in RLC entity 1 and RLC entity 3;
5. a total amount of the PDCP data volume and the RLC data volume to be initially transmitted in RLC entities that are configured for the first bearer, have been activated and have initial transmission data, for example, assuming that the first bearer is configured with RLC entity 1, RLC entity 2, RLC entity 3 and RLC entity 4, RLC entities that are configured for the first bearer and have been activated include RLC entity 1, RLC entity 2 and RLC entity 3, among the RLC entity 1, RLC entity 2 and RLC entity 3, the RLC entities that have initial transmission data include RLC entity 1 and RLC entity 3, then the initial transmission data volume corresponding to the first bearer is the total amount of the PDCP data volume and the RLC data volume to be initially transmitted in RLC entity 1 and RLC entity 3;
6. a total amount of the PDCP data volume and the RLC data volume to be initially transmitted in the first RLC entity and the second RLC entity, that is, the total amount of the PDCP data volume and the RLC data volume to be initially transmitted in the RLC entities for the split transmission.

In the case that the first bearer is configured with at least two RLC entities, when redefining the split transmission condition, the terminal device can give sufficient consideration to the amount of data to be transmitted on the RLC entities that may have data to be transmitted, which can ensure data on the RLC entities that have data to be transmitted to be transmitted.

The wireless communication method according to the embodiments of the present application is described in detail from the perspective of a terminal device with reference to FIGS. 3 to 5, and a wireless communication method according to another embodiment of the present application is described in detail below from the perspective of a network device with reference to FIG. 6. It should be understood that the description on the side of the network device corresponds to the description on the side of the terminal device, and similar descriptions can be referred to above, which are not repeated here to avoid repetition.

FIG. 6 is a schematic flowchart of a wireless communication method 400 according to still another embodiment of the present application. The method 400 may be performed by a network device in the communication system shown in FIG. 1. As shown in FIG. 6, the method 400 includes the following contents:

In S410, first information is transmitted to the terminal device from the network device, and the first information is used for indicating RLC entities that are used when the data duplication transmission of a bearer is deactivated and the split transmission condition is met.

Optionally, in some embodiments, the first information is carried in a first signaling, and the first signaling is at least one of:

A Media access control (MAC) control element (CE) signaling, a downlink control information (DCI) signaling and a radio resource control (RRC) signaling.

Optionally, in some embodiments, the first information includes at least one of:

a RLC entity identity, a logical channel (LCH) identity, a cell group identity, and a quantity of RLC entities.

In some embodiments, the first signaling may further include second information, and the second information is used for indicating an RLC entity that is used for data transmission when the split transmission condition is not met.

Optionally, in some embodiments, the second information includes at least one of:

a RLC entity identity, a logical channel (LCH) identity (ID), a cell group identity (ID).

Optionally, in some embodiments, the MAC CE is not the duplication MAC CE, and the MAC CE corresponds to a specific LCH identity.

Optionally, in some embodiments, the first information is carried in a first duplication MAC CE, and the first duplication MAC CE is used for indicating the alteration of the RLC entity and/or activation or deactivation of the data duplication transmission of the first bearer.

Optionally, in some embodiments, the first duplication MAC CE further includes indication information, where the indication information is used for indicating a data transmission mode, and the data transmission mode includes at least two of:

a data transmission mode where the data duplication transmission of the first bearer is activated, a data transmission mode where the data duplication transmission of the first bearer is deactivated, and the split transmission.

Optionally, in some embodiments, the first duplication MAC CE is used for indicating the alteration of the RLC entity, and the second duplication MAC CE is used for indicating the activation or deactivation of the data duplication transmission of the first bearer; or the first duplication MAC CE is used for indicating the alteration of the RLC entity and the activation/deactivation of the data duplication transmission of the first bearer; or the first duplication MAC CE is used for indicating the alteration of the RLC entity and the activation of the data duplication transmission of the first bearer, and the second duplication MAC CE is used for indicating the deactivation of the data duplication transmission of the first bearer; or the first duplication MAC CE is used for indicating the alteration of the RLC entity and the activation/deactivation of the data duplication transmission of the first bearer, and the second duplication MAC CE is used for indicating the activation or deactivation of the data duplication transmission of the first bearer.

Optionally, in some embodiments, the first duplication MAC CE is a release 16 duplication MAC CE, and the second duplication MAC CE is a release 15 duplication MAC CE.

The method embodiments of the present application are described in detail above with reference to FIGS. 3 to 6, and the device embodiments of the present application are described in detail below with reference to FIGS. 7 to 11. It should be understood that the device embodiments correspond to the method embodiments, and similar description may refer to the method embodiment.

FIG. 7 is a schematic block diagram illustrating a terminal device 500 according to embodiments of the present application. As shown in FIG. 7, the terminal device 500 includes:

a communication module 510, configured to perform the split transmission by using a first radio links control (RLC) entity and a second RLC entity in at least two RLC entities configured for a first bearer in the case that data duplication transmission of the first bearer is deactivated and a split transmission condition is met.

Optionally, the terminal device further includes:

a determination module, configured to determine the first RLC entity and the second RLC entity for the split transmission among the at least two RLC entities configured for the first bearer.

Optionally, the determination module is further configured to:

determine the first RLC entity and the second RLC entity for the split transmission according to first information, and the first information is used for indicating RLC entities that are used when the split transmission condition is met.

Optionally, the first information is carried in a first signaling, and the first signaling is at least one of:

A Media access control (MAC) control element (CE) signaling, a downlink control information (DCI) signaling and a radio resource control (RRC) signaling.

Optionally, the first information includes at least one of: a RLC entity identity, a logical channel (LCH) identity, a cell group identity, and a quantity of RLC entities.

Optionally, the first signaling may further include second information, and the second information is used for indicating RLC entities that are used for data transmission when the split transmission condition is not met.

Optionally, the second information includes at least one of:

a RLC entity identity, a logical channel (LCH) identity (ID), a cell group identity (ID).

Optionally, the MAC CE is not a duplication MAC CE, and corresponds to a specific LCH identity.

Optionally, the first information is carried in a first duplication MAC CE, and the first duplication MAC CE is used for indicating alteration of the RLC entity and/or activation or deactivation of the data duplication transmission of the first bearer.

Optionally, the first information is used for indicating at least two available RLC entities, and the determination module is further configured to:

determine the first RLC entity and the second RLC entity for the split transmission among the at least two available RLC entities.

Optionally, the first duplication MAC CE further includes indication information, where the indication information is used for indicating a data transmission mode, and the data transmission mode includes at least two of:

a data transmission mode where the data duplication transmission of the first bearer is activated, a data transmission mode where the data duplication transmission of the first bearer is deactivated, and the split transmission.

Optionally, the determination module is further configured to:

determine a RLC entity for the data duplication transmission among at least two available RLC entities indicated by the first information in the case that the data duplication transmission of the first bearer is activated; or determine a RLC entity for data transmission among the at least two available RLC entities indicated by the first information in the case that the data duplication transmission of the first bearer is deactivated and the split transmission condition is not satisfied.

Optionally, the first duplication MAC CE is used for indicating the alteration of the RLC entity, and the second duplication MAC CE is used for indicating the activation or deactivation of the data duplication transmission of the first bearer; or the first duplication MAC CE is used for indicating the alteration of the RLC entity and the activation/deactivation of the data duplication transmission of the first bearer; or the first duplication MAC CE is used for indicating the alteration of the RLC entity and the activation of the data duplication transmission of the first bearer, and the second duplication MAC CE is used for indicating the deactivation of the data duplication transmission of the first bearer; or the first duplication MAC CE is used for indicating the alteration of the RLC entity and the activation/deactivation of the data duplication transmission of the first bearer, and the second duplication MAC CE is used for indicating the activation or deactivation of the data duplication transmission of the first bearer.

Optionally, the first duplication MAC CE is a release 16 duplication MAC CE, and the second duplication MAC CE is a release 15 duplication MAC CE.

Optionally, the first RLC entity and the second RLC entity are a combination of any two of the following:

a primary RLC entity of the first bearer;
a primary RLC entity of a master cell group (MCG) of the first bearer;
a primary RLC entity of a secondary cell group (SCG) of the first bearer;
a secondary RLC entity of the master cell group (MCG) of the first bearer; and
a secondary RLC entity of the secondary cell group (SCG) of the first bearer.

Optionally, the communication module 510 is further configured to:

perform data transmission by using a third entity in the case that the data duplication transmission of the first bearer is deactivated and the split transmission condition is not met.

Optionally, the third RLC entity includes at least one of:
the primary RLC entity of the first bearer;
the primary RLC entity of the master cell group (MCG) of the first bearer;
the primary RLC entity of the secondary cell group (SCG) of the first bearer;
any RLC entity of the first bearer; and
a RLC entity identified by a specific LCH of the first bearer.

Optionally, the split transmission condition includes that the initial transmission data volume corresponding to the first bearer is greater than a first threshold.

Optionally, the initial transmission data volume corresponding to the first bearer is one of:
a total amount of the PDCP data volume and the RLC data volume to be initially transmitted in all the RLC entities configured for the first bearer;
a total amount of the PDCP data volume and the RLC data volume to be initially transmitted in the RLC entities that are configured for the first bearer and are being activated;
a total amount of the PDCP data volume and the RLC data volume to be initially transmitted in the RLC entities that are configured for the first bearer and have been activated;
a total amount of the PDCP data volume and the RLC data volume to be initially transmitted in the RLC entities that are configured for the first bearer, have been activated and have data to be transmitted;
a total amount of the PDCP data volume and the RLC data volume to be initially transmitted in the RLC entities that are configured for the first bearer, have been activated and have data to be initially transmitted; and
a total amount of the PDCP data volume and the RLC data volume to be initially transmitted in the first RLC entity and the second RLC entity.

Optionally, in some embodiments, the communication module may be a communication interface or a transceiver, or an input/output interface of a communication chip or a system-on-chip. The determination module may be one or more processors.

It should be understood that the terminal device 500 according to the embodiments of the present disclosure may correspond to the terminal device in the method embodiments of the present disclosure, and the above and other operations and/or functions of each unit in the terminal device 500 are to implement the corresponding process of the terminal device in the method 200 shown in FIG. 3, respectively. For the sake of brevity, it is not repeated here.

FIG. 8 is a schematic block diagram of a network device according to embodiments of the present application. The network device 700 shown in FIG. 8 includes:
a communication module 710, configured to transmit first information to the terminal device, and the first information is used for indicating a RLC entity that is used when data duplication transmission of a bearer is deactivated and split transmission condition is met.

Optionally, the first information is carried in a first signaling, and the first signaling is at least one of:
A Media access control (MAC) control element (CE) signaling, a downlink control information (DCI) signaling and a radio resource control (RRC) signaling.

Optionally, the first information includes at least one of:
a RLC entity identity, a logical channel (LCH) identity, a cell group identity, and a quantity of RLC entities.

Optionally, the first signaling may further include second information, and the second information is used for indicating RLC entities that are used for data transmission when the split transmission condition is not met.

Optionally, the second information includes at least one of:
a RLC entity identity, a logical channel (LCH) identity (ID), a cell group identity (ID).

Optionally, the MAC CE is not a duplication MAC CE, and corresponds to a specific LCH identity.

Optionally, the first information is carried in a first duplication MAC CE, and the first duplication MAC CE is used for indicating alteration of the RLC entity and/or activation or deactivation of the data duplication transmission of the first bearer.

Optionally, the first duplication MAC CE further includes indication information, where the indication information is used for indicating a data transmission mode, and the data transmission mode includes at least two of:
a data transmission mode where the data duplication transmission of the first bearer is activated, a data transmission mode where the data duplication transmission of the first bearer is deactivated, and the split transmission.

Optionally, the first duplication MAC CE is used for indicating the alteration of the RLC entity, and the second duplication MAC CE is used for indicating the activation or deactivation of the data duplication transmission of the first bearer; or
the first duplication MAC CE is used for indicating the alteration of the RLC entity and the activation/deactivation of the data duplication transmission of the first bearer; or
the first duplication MAC CE is used for indicating the alteration of the RLC entity and the activation of the data duplication transmission of the first bearer, and the second duplication MAC CE is used for indicating the deactivation of the data duplication transmission of the first bearer; or
the first duplication MAC CE is used for indicating the alteration of the RLC entity and the activation/deactivation of the data duplication transmission of the first bearer, and the second duplication MAC CE is used for indicating the activation or deactivation of the data duplication transmission of the first bearer.

Optionally, the first duplication MAC CE is a release 16 duplication MAC CE, and the second duplication MAC CE is a release 15 duplication MAC CE.

Optionally, in some embodiments, the communication module may be a communication interface or a transceiver, or an input/output interface of a communication chip or a system-on-chip.

It should be understood that the network device 700 according to the embodiments of the present disclosure may correspond to the network device in the method embodiments of the present disclosure, and the above and other operations and/or functions of each unit in the network device 700 are to implement the corresponding process of the network device in the method 400 shown in FIG. 6, respectively. For the sake of brevity, it is not repeated here.

FIG. 9 is a schematic structural diagram illustrating a communication device 1100 provided by embodiments of the present disclosure. The communication device 1100 shown in FIG. 9 includes a processor 1110. The processor 1110 may call a computer program from a memory and run the computer program to implement the method provided in the embodiments of the present disclosure.

Optionally, as shown in FIG. 9, the communication device 1100 may further include a memory 1120. The processor 1110 may call the computer program from the memory 1120 and run the computer program to implement the method provided in the embodiments of the present disclosure.

The memory 1120 may be separated from the processor 1110, or may be integrated into the processor 1110.

Optionally, as shown in FIG. 9, the communication device 1100 may further include a transceiver 1130, and the processor 1110 may control the transceiver 1130 to communicate with other devices. Specifically, the transceiver 1130 may transmit information or data to other devices, or receive information or data transmitted from other devices.

The transceiver 1130 may include a transmitter and a receiver. The transceiver 1130 may further include antennas, and the number of antennas may be one or more.

Optionally, the communication device 1100 may be the network device of the embodiments of the present application, and may implement the corresponding process implemented by the network device in each method of the embodiments of the present application. For the sake of brevity, details are not repeated here.

Optionally, the communication device 1100 may be a mobile terminal/terminal device of the embodiments of the present disclosure, and may implement the corresponding process implemented by the mobile terminal/terminal device in each method of the embodiments of the present disclosure. For the sake of brevity, details are not repeated here.

Figure 10:
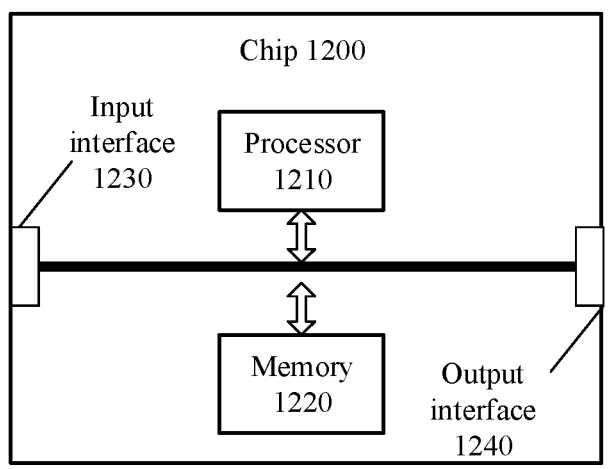
FIG. 10 is a schematic block diagram illustrating a chip provided by embodiments of the present application.

FIG. 10 is a schematic structural diagram of a chip provided by an embodiment of the present disclosure. The chip 1200 shown in FIG. 10 includes a processor 1210. The processor 1210 may call a computer program from a memory and run the computer program to implement the method provided in the embodiments of the present disclosure.

Optionally, as shown in FIG. 10, the chip 1200 may further include a memory 1220. The processor 1210 may call the computer program from the memory 1220 and run the computer program to implement the method provided in the embodiments of the present disclosure.

The memory 1220 may be separated from the processor 1210, or may be integrated into the processor 1210.

Optionally, the chip 1200 may further include an input interface 1230. The processor 1210 can control the input interface 1230 to communicate with other devices or chips, and specifically, can obtain information or data transmitted from other devices or chips.

Optionally, the chip 1200 may further include an output interface 1240. The processor 1210 can control the output interface 1240 to communicate with other devices or chips, and specifically, can output information or data to other devices or chips.

Optionally, the chip may be applied to the network device in the embodiments of the present disclosure, and may implement the corresponding process implemented by the network device in each method of the embodiments of the present disclosure. For the sake of brevity, details are not repeated here.

Optionally, the chip may be applied to the mobile terminal/terminal device of the embodiments of the present disclosure, and may implement the corresponding process implemented by the mobile terminal/terminal device in each method of the embodiments of the present disclosure. For the sake of brevity, details are not repeated here.

It should be understood that the chip described in embodiments of the present disclosure can also be referred to as a system on chip, a system chip or a chip system and so on.

Figure 11:
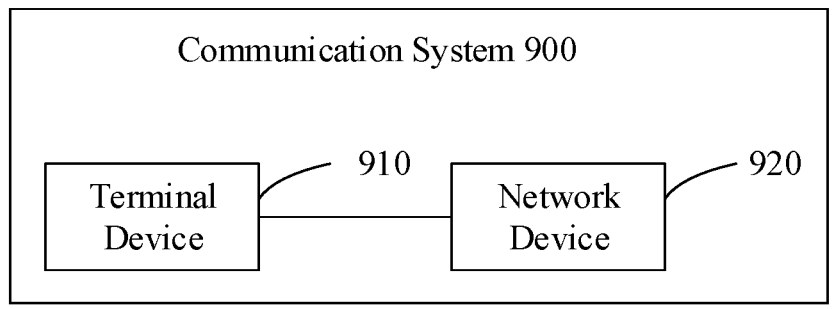
FIG. 11 is a schematic diagram illustrating a communication system provided by embodiments of the present disclosure.

FIG. 11 is a schematic block diagram illustrating a communication system 900 provided by embodiments of the present disclosure. As shown in FIG. 11, the communication system 900 includes a terminal device 910 and a network device 920.

The terminal device 910 may implement corresponding functions performed by the terminal device in methods described above, and the network device 920 may implement corresponding functions performed by the network device in the methods described above. For the sake of brevity, details are not repeated here.

It should be understood that the processor of the embodiments of the present disclosure may be an integrated circuit chip with signal processing capability. In the implementation process, the steps of the foregoing method embodiments can be performed by hardware integrated logic circuits in the processor or instructions in the form of software. The above-mentioned processor can be a general-purpose processor, a digital signal processor (DSP), an application specific integrated circuit (ASIC), a field programmable gate array (FPGA) or other programmable logic devices, discrete gates or transistor logic devices, discrete hardware components. The methods, steps, and logical block diagrams disclosed in the embodiments of the present application can be implemented or executed. The general-purpose processor may be a microprocessor or the processor may also be any conventional processor or the like. The steps of the method disclosed in the embodiments of the present application can be directly executed by a hardware decoding processor, or executed by a combination of hardware and software modules in the decoding processor. The software module can be located in a mature storage medium in the field such as a random access memory, a flash memory, a read-only memory, a programmable read-only memory, or an electrically erasable programmable memory, registers. The storage medium is located in the memory, and the processor reads the information in the memory and completes the steps of the above method in combination with its hardware.

It should be understood that the memory in the embodiments of the present disclosure may be volatile memory or non-volatile memory, or may include both volatile and non-volatile memory. The non-volatile memory can be a read-only memory (ROM), a programmable read-only memory (PROM), an erasable programmable read-only memory (EPROM), and an Electrically Erasable programmable read-only memory (EEPROM) or a flash memory. The volatile memory may be a random access memory (RAM), which is used as an external cache. By way of example, but not limitation, many forms of RAM are available, such as a static random access memory (SRAM), a dynamic random access memory (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It should be noted that the memories of the systems and methods described herein are intended to include, but are not limited to, these memories and any other suitable types of memories.

It should be understood that the above memories are exemplary rather than limitation. For example, the memory in the embodiments of the present disclosure may be a static RAM (SRAM), a dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM) and so on. In other words, the memories in the embodiments of the present disclosure are intended to include, but are not limited to, these memories and any other suitable types of memories.

The embodiments of the present disclosure further provide a computer readable storage medium for storing computer programs.

Optionally, the computer readable storage medium may be applied to the network device provided in the embodiments of the present disclosure, and the computer programs cause the computer to execute the corresponding process implemented by the network device in each method of the embodiments of the present disclosure. For brevity, details are not described herein again.

Optionally, the computer readable storage medium may be applied to the mobile terminal/terminal device provided in the embodiments of the present disclosure, and the computer programs cause the computer to execute the corresponding process implemented by the mobile terminal/terminal device in each method of the embodiments of the present disclosure. For brevity, details are not described herein again.

The embodiments of the present disclosure further provide a computer program product including computer program instructions.

Optionally, the computer program product may be applied to the network device provided in the embodiments of the present disclosure, and the computer program instructions cause the computer to execute the corresponding process implemented by the network device in each method of the embodiments of the present disclosure. For brevity, details are not described herein again.

Optionally, the computer program product may be applied to the mobile terminal/terminal device provided in the embodiments of the present disclosure, and the computer program instructions cause the computer to execute the corresponding process implemented by the mobile terminal/terminal device in each method of the embodiments of the present disclosure. For brevity, details are not described herein again.

The embodiments of the present application further provide a computer program.

Optionally, the computer program may be applied to the network device provided in the embodiments of the present disclosure, and the computer program, when run on a computer, causes the computer to execute the corresponding process implemented by the network device in each method of the embodiments of the present disclosure. For brevity, details are not described herein again.

Optionally, the computer program may be applied to the mobile terminal/terminal device provided in the embodiments of the present disclosure, and the computer program, when run on a computer, causes the computer to execute the corresponding process implemented by the mobile terminal/terminal device in each method of the embodiments of the present disclosure. For brevity, details are not described herein again.

Those skilled in the art may realize that the units and algorithm steps of the examples described in combination with the embodiments can be implemented by electronic hardware or a combination of computer software and electronic hardware. Whether these functions are executed by hardware or software depends on the specific application and design constraints of the technical solution. Professionals and technicians can use different methods for each specific application to implement the described functions, but such implementation should not be considered beyond the scope of this application.

Those skilled in the art can clearly understand that, for convenience and concise description, the specific working process of the above-described system, device, and units can refer to the corresponding process in the foregoing method embodiment, and details are not repeated herein.

In some embodiments provided in the present disclosure, it should be understood that the proposed system, device, and method may be implemented in other ways. For example, the device embodiments described above are merely illustrative.

For example, the division of the units is only a logical function division, and there may be other divisions in actual implementation, for example, multiple units or components may be combined or can be integrated into another system, or some features can be ignored or not implemented.

In addition, the displayed or discussed mutual coupling or direct coupling or communication connection may be indirect coupling or communication connection through some interfaces, devices or units, and may be in electrical, mechanical or other forms.

The units described as separated components may or may not be physically separated, and the components displayed as units may or may not be physical units, that is, they may be located at one place, or they may be distributed on multiple network units. Some or all of the units may be selected according to actual needs to achieve the objectives of the solutions of the embodiments.

In addition, the functional units in the various embodiments of the present disclosure may be integrated into one processing unit, or the units are separated physically, or two or more units may be integrated into one unit.

If the function is implemented in the form of a software functional unit and sold or used as an independent product, it can be stored in a computer readable storage medium. In view of this, the technical solution of this application in essence or the part that contributes to the prior art or the part of the technical solution can be embodied in the form of a software product, and the computer software product is stored in a storage medium. The storage medium includes several instructions so that a computer (which may be a personal computer, a server, or a network device, etc.) executes all or part of the steps of the methods described in the various embodiments of the present disclosure. The aforementioned storage medium includes: U disk, mobile hard disk drive, Read-Only Memory (ROM), Random Access Memory (RAM), magnetic disks or optical disks and other media that can store program codes.

The foregoing descriptions are merely exemplary implementations of the present disclosure, but the protection scope of the present disclosure is not limited thereto. Any changes or substitutions easily conceived by those skilled in the art based on the contents of the present disclosure fall within the protection scope of the present disclosure. Therefore, the protection scope of the present disclosure shall be defined by the appended claims.

What is claimed is:

1. A wireless communication method, comprising:
  in response to determining that a data duplication transmission of a first bearer is deactivated and a split transmission condition is met, performing, by a terminal device, a split transmission by using a first radio link control (RLC) entity and a second RLC entity in at least two RLC entities configured for the first bearer;

receiving, by the terminal device, first information from a network device; and determining, by the terminal device, among more than two RLC entities of the first bearer, the first RLC entity and the second RLC entity for the split transmission according to the first information, wherein the first information is used for indicating RLC entities among the more than two RLC entities that are used when the split transmission condition is met, wherein the split transmission condition comprises that an initial transmission data volume corresponding to the first bearer is greater than a first threshold, and wherein the first RLC entity and the second RLC entity are different, and comprise:

the first RLC entity is an RCL entity carrying a master cell group of the first bearer, and the second RLC entity is an RCL entity carrying a secondary cell group of the first bearer; or the first RLC entity is an RCL entity carrying the secondary cell group of the first bearer, and the second RLC entity is an RCL entity carrying the master cell group of the first bearer.

2. The method according to claim 1, wherein the first information is carried in a first signaling, and the first signaling is a radio resource control (RRC) signaling.

3. The method according to claim 1, further comprising:
performing, by the terminal device, data transmission by using a third entity in response to determining that the data duplication transmission of the first bearer is deactivated and the split transmission condition is not met.

4. The method according to claim 3, wherein the third RLC entity comprises a primary RLC entity of the first bearer.

5. The method according to claim 1, wherein the initial transmission data volume corresponding to the first bearer is:

a total amount of packet data convergence protocol (PDCP) data volume and RLC data volume to be initially transmitted in the first RLC entity and the second RLC entity.

6. A wireless communication method, comprising:
transmitting, by a network device, first information to a terminal device, wherein the first information is used for indicating radio link control (RLC) entities among more than two RLC entities that are used when a data duplication transmission of a bearer is deactivated and a split transmission condition is met and instruct the terminal device to determine among the more than two RLC entities of the bearer, a first RLC entity and a second RLC entity for the split transmission, wherein the split transmission condition comprises that an initial transmission data volume corresponding to the bearer is greater than a first threshold, and wherein the first RLC entity and the second RLC entity are different, and comprise:

the first RLC entity is an RCL entity carrying a master cell group of the first bearer, and the second RLC entity is an RCL entity carrying a secondary cell group of the first bearer; or the first RLC entity is an RCL entity carrying the secondary cell group of the first bearer, and the second RLC entity is an RCL entity carrying the master cell group of the first bearer.

7. The method according to claim 6, wherein the first information is carried in a first signaling, and the first signaling is a radio resource control (RRC) signaling.

8. A terminal device, comprising a processor and a memory, wherein the memory is configured to store a computer program, and the processor is configured to call the computer program stored in the memory and run the computer program, to:

perform, by using a first radio link control (RLC) entity and a second RLC entity in at least two RLC entities configured for a first bearer, a split transmission in response to determining that data duplication transmission of the first bearer is deactivated and a split transmission condition is met;

receive first information from a network device; and determine, among more than two RLC entities of the first bearer, the first RLC entity and the second RLC entity for the split transmission according to the first information, wherein the first information is used for indicating RLC entities among the more than two RLC entities that are used when the split transmission condition is met, wherein the split transmission condition comprises that an initial transmission data volume corresponding to the first bearer is greater than a first threshold, and wherein the first RLC entity and the second RLC entity are different, and comprise:

the first RLC entity is an RCL entity carrying a master cell group of the first bearer, and the second RLC entity is an RCL entity carrying a secondary cell group of the first bearer; or the first RLC entity is an RCL entity carrying the secondary cell group of the first bearer, and the second RLC entity is an RCL entity carrying the master cell group of the first bearer.

9. The terminal device according to claim 8, wherein the first information is carried in a first signaling, and the first signaling is a radio resource control (RRC) signaling.

10. The terminal device according to claim 8, wherein the processor is further configured to:

perform data transmission by using a third entity in response to determining that the data duplication transmission of the first bearer is deactivated and the split transmission condition is not met.

11. The terminal device according to claim 10, wherein the third RLC entity comprises a primary RLC entity of the first bearer.

12. The terminal device according to claim 8, wherein the initial transmission data volume corresponding to the first bearer is:

a total amount of packet data convergence protocol (PDCP) data volume and RLC data volume to be initially transmitted in the first RLC entity and the second RLC entity.

13. A network device, comprising a processor and a memory, wherein the memory is configured to store a computer program, and the processor is configured to call the computer program stored in the memory and run the computer program, to execute a method, the method comprising: transmitting, by a network device, first information to a terminal device, wherein the first information is used for indicating radio link control (RLC) entities among more than two RLC entities that are used when a data duplication transmission of a bearer is deactivated and a split transmission condition is met and instruct the terminal device to determine among the more than two RLC entities of the bearer, a first RLC entity and a second RLC entity for the split transmission, wherein the split transmission condition comprises that an initial transmission data volume corresponding to the bearer is greater than a first threshold, and wherein the first RLC entity and the second RLC entity are different, and comprise:

the first RLC entity is an RCL entity carrying a master cell group of the first bearer, and the second RLC entity is an RCL entity carrying a secondary cell group of the first bearer; or the first RLC entity is an RCL entity carrying the secondary cell group of the first bearer, and the second RLC entity is an RCL entity carrying the master cell group of the first bearer.

14. A non-transitory computer-readable storage medium for storing a computer program, wherein the computer program causes a computer to execute a method, the method comprising:

in response to determining that a data duplication transmission of a first bearer is deactivated and a split transmission condition is met, performing, by a terminal device, a split transmission by using a first radio link control (RLC) entity and a second RLC entity in at least two RLC entities configured for the first bearer;

receiving, by the terminal device, first information from a network device; and determining, by the terminal device, among more than two RLC entities of the first bearer, the first RLC entity and the second RLC entity for the split transmission according to first information, wherein the first information is used for indicating RLC entities among the more than two RLC entities that are used when the split transmission condition is met, wherein the split transmission condition comprises that an initial transmission data volume corresponding to the first bearer is greater than a first threshold, and wherein the first RLC entity and the second RLC entity are different, and comprise:

the first RLC entity is an RCL entity carrying a master cell group of the first bearer, and the second RLC entity is an RCL entity carrying a secondary cell group of the first bearer; or the first RLC entity is an RCL entity carrying the secondary cell group of the first bearer, and the second RLC entity is an RCL entity carrying the master cell group of the first bearer.

* * * * *